United States Patent [19]
Whitley, Jr.

[11] 3,722,908
[45] Mar. 27, 1973

[54] TORSION BAR SUSPENSION SYSTEM FOR TANDEM TRAILER WHEELS

[76] Inventor: William P. Whitley, Jr., 4525 E. 10th Lane, Hialeah, Fla. 33103

[22] Filed: Aug. 24, 1971

[21] Appl. No.: 174,365

[52] U.S. Cl..........................280/124 B, 280/104.5 R
[51] Int. Cl..............................................B60g 3/12
[58] Field of Search.........280/124 B, 124 R, 104.5 R

[56] References Cited

UNITED STATES PATENTS 3,241,855    3/1966    Kersey...........................280/124 B

FOREIGN PATENTS OR APPLICATIONS 1,132,691    11/1956    France.........................280/104.5 R

*Primary Examiner*—Philip Goodman
*Attorney*—Ernest H. Schmidt

[57] ABSTRACT

A torsion bar suspension system for tandem wheels, suitable for use in boat trailers and the like, is described. An elongated, rectangular, supporting framework carries a pair of transversely-extending, horizontally-spaced torsion bars the outer ends of which have secured thereto, at each side of the supporting framework, downwardly and oppositely outwardly-extending moment arm members the outer ends of which journal the tandem wheel sets. Midway along their lengths, the torsion bars are securely affixed to a wrench bar bridging said torsion bars and adapted to effect reaction therebetween and at the same time provide for substantially independent torsional suspension for each of the supported wheels along its directly associated half torsion bar. End portions of the bridging wrench bar are seatingly supported upon transversely-extending portions of the support framework at a somewhat elevated eccentric position with respect to the ends of said torsion bars to constrain said torsion bars in slightly upwardly curved or bowed disposition for canting the wheels inwardly.

6 Claims, 4 Drawing Figures

Patented March 27, 1973  3,722,908

INVENTOR
WILLIAM P. WHITLEY JR.
BY Ernest H Schmidt
ATTORNEY.

3,722,908

TORSION BAR SUSPENSION SYSTEM FOR TANDEM TRAILER WHEELS

This invention relates to wheel suspensions for trailers and is directed particularly to an improved torsion bar suspension mechanism for the wheels of boat trailers.

In my patent application Ser. No. 587,314 filed Jan. 5, 1970, issued Jan. 4, 1972 as U.S. Pat. No. 3,632,138, I describe an immersible boat trailer with boat cradling and latching means and including a tandem wheel assembly or bogey comprising a torsion bar mechanism for independently supporting each of the trailer wheels. The present invention is directed to an improved and simplified torsion bar suspension system for tandem trailer wheels The principal object of this invention is to provide a torsion bar suspension system for boat trailers and the like which is particularly well adapted to use with low-slung trailer carriage frames of the type suitable for positioning partially submerged in shallow water with the main trailer boat support surfaces under the water to permit a trailer boat to be floated onto or off the trailer.

Another object of the invention is to provide a torsion bar suspension system of the character described wherein each pair of laterally opposed wheels of the tandem set are supported by a common, transversely-extending torsion bar, the wheels being so disposed at the ends of moment arms affixed at their inner ends to the outer ends of said torsion bars that the torsional stresses imposed upon said torsion bars will be in opposite directions, and wherein central portions of said torsion bars, along their lengths, will be rigidly interjoined or bridged by a wrench bar, whereby the suspension system will be self reactive so that minimal stress other than that of the carriage load will be imposed upon the trailer framework.

Yet another object of the invention is to provide a torsion bar suspension system for boat trailers and the like wherein the individual torsion bar suspension mechanism controlling each wheel of the tandem set is substantially independent acting with respect to the torsion bar suspensions of the remaining wheels while, at the same time, under conditions of disproportionate stress being imposed in one or more of the wheel suspensions of the set, a transfer of excessive torsional stress is effected in the remaining one or more torsional wheel suspensions to minimize any possibility of permanent damage or strain in the suspension system.

Other objects, features, and advantages of the invention will be apparent from the following description when read with reference to the accompanying drawings. In the drawings, wherein like reference numerals denote corresponding parts through the several views.

Figure 1:
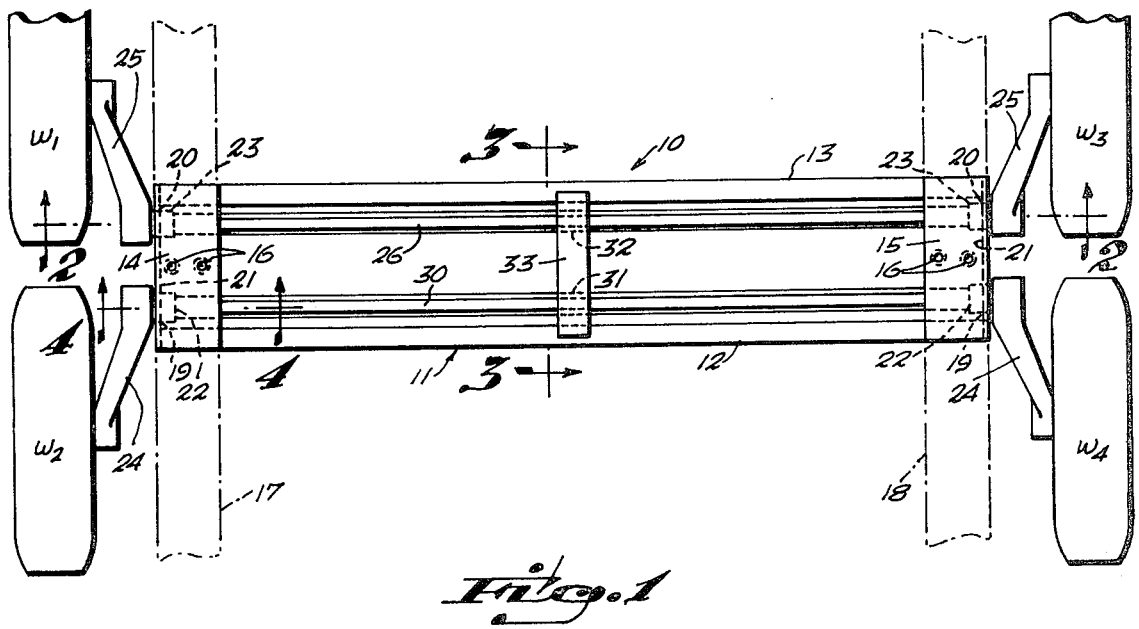
FIG. 1 is a plan view, as seen from above, of a torsion bar suspension system for tandem wheels embodying the invention.
Figure 2:
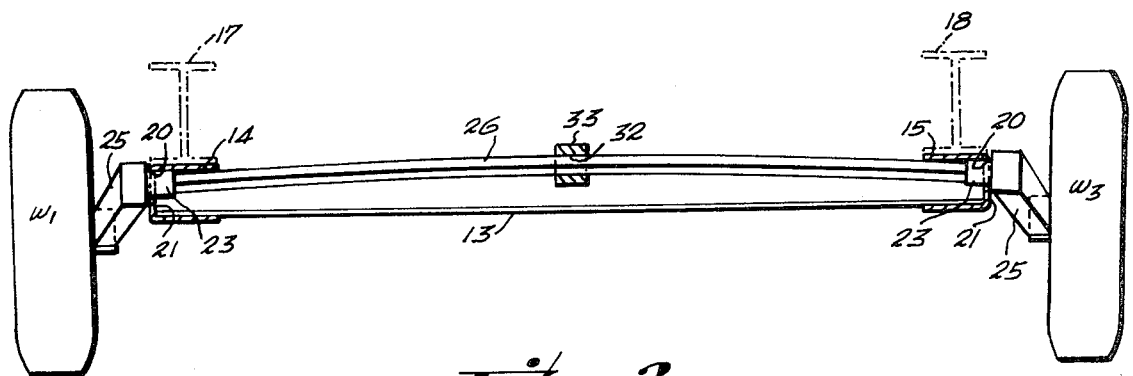
FIG. 2 is a transverse cross-sectional view taken along the line 2—2 of FIG. 1 in the direction of the arrows and illustrating constructional details of the system.

Referring now in detail to the drawing, 10 designates, generally, a torsion bar suspension system for tandem trailer wheels embodying the invention and supporting tandem wheel pairs $W_1$, $W_2$ at one side of the system and $W_3$, $W_4$ at the other side of the system. The torsion bar suspension system 10 has a substantially rectangular supporting framework 11 comprising spaced, rectangular tube members 12, 13 interjoined at their ends such as by having welded therebetween end channel members 14 and 15. As illustrated in FIGS. 1 and 2, the supporting framework 11 is adapted to be secured to the undercarriage of a trailer, such as a boat trailer, by the use of bolts (not illustrated) extending upwardly through openings 16 in the end channel members 14, 15 for attachment in adjusted position through corresponding openings in longitudinally-extending main frame members of a trailer carriage, indicated partially in broken-line representation and designated 17 and 18 in FIGS. 1 and 2. While a detailed description of a trailer with which the herein disclosed suspension system is particularly well suited to use is not deemed necessary for understanding of the present invention, reference can be had to applicant's patent herein above referred to for such a detailed description.

Figures 3, 4:
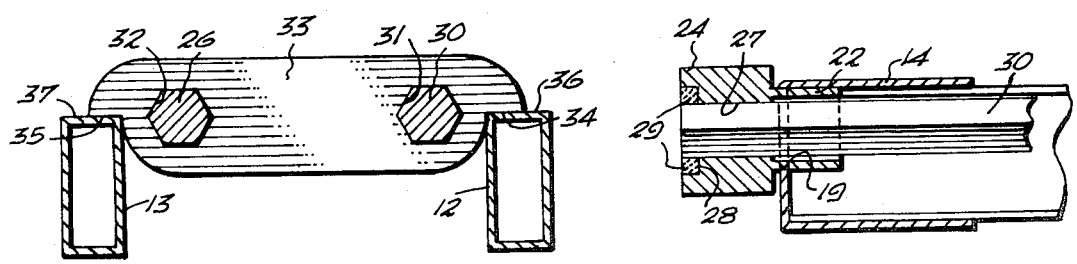
FIG. 3 is a longitudinal cross-sectional view taken along 3—3 of FIG. 1 in the direction of the arrows.
FIG. 4 is a partial transverse cross-sectional view taken along the line 4—4 of FIG. 1 in the direction of the arrows.

The end channel members 14, 15 are each provided with a pair of longitudinally-spaced openings 19, 20 in the vertical wall web portions 21 thereof for the reception of sleeve hub portions 22, 23 of moment arm members 24, 25 associated with each pair of tandem wheels $W_1$, $W_2$ and $W_3$, $W_4$. The laterally opposed moment arm members 25, 25 at each side of the supporting framework 11 are interjoined by a first transversely-extending torsion bar 26, the ends of which extend through openings 27 in said moment arm members (only one illustrated in FIG. 4). The torsion bar 26 is preferably hexagonal in cross-sectional shape, as illustrated in FIG. 3, as are the through openings 27 in the moment arm members 24, 25 within which the ends of said torsion bar are received. An internal, annular recess 28 provided at the outer end of each of the sleeve hub portions 22, 23 of the moment arm members 24 and 25 is filled with a weld, as indicated at 29 in FIG. 4, to insure against accidental withdrawing or loosening of said moment arm members with respect to their associated torsion bar 26.

A second torsion bar 30 in substantially spaced, parallel disposition with respect to the first torsion bar 26 is similarly affixed between the second opposed pair of moment arm members 24, 24. As illustrated in FIGS. 1, 2, and 3, the torsion bars 26 and 30 pass through a pair of longitudinally-spaced, hexagonal openings 31, 32 provided in a bridging wrench bar 33 arranged midway along the lengths of said torsion bars. The torsion bars 26, 30 are snugly received in their respective hexagonal openings 31, 32 in the wrench bar 33 so as to submit rotative or torsional stresses imposed by either one of the torsion bars to a reactive stress imposed by the other. The wrench bar 33, moreover, is formed at each end with downwardly-facing shoulders 34, 35 which normally seat upon upper surface portions of the upper arms 36, 37 of the rectangular tubes 12, 13, respectively (FIG. 3). As illustrated in FIG. 2, since the sleeve hub portions 22, 23 of members 24, 25 lie in a transverse plane which is somewhat below the transverse axes of the hexagonal openings 31, 32 in the wrench bar 33 through which the torsion bars 26 and 30 pass, said torsion bars will be constrained to bow upwardly. As a result thereof, the tandem wheel pairs $W_1$, $W_2$, and $W_3$, $W_4$ will cant upwardly two or three degrees under ordinary no-load conditions. As illustrated in FIGS. 1 and 2 the moment arm members 24, 24, are arranged to extend longitudinally and somewhat downwardly in one direction, while the moment arm members 24, 24 associated with the torsion bar 30 are arranged to extend downwardly and outwardly in the opposite direction so that the torsional stresses imposed upon said torsion bars through the tandem wheels $W_1$, $W_2$ and $W_3$, $W_4$ will be in opposition. It will be understood that the outer ends of the moment arm members 24, 25 are provided with laterally outwardly-extending spindles (not illustrated), upon which the wheels $W_1$, $W_2$, $W_3$, and $W_4$ are journalled by the use of any suitable anti-friction bearing means.

In operation it is to be noted that the torsional suspension of each of the wheels $W_1$, $W_2$, $W_3$, $W_4$ is controlled directly by its associated half torsion bar, so that substantially independent torsion bar suspension is achieved in each of the four wheels with the use of only the two torsion bars 26 and 30. At the same time the reactive forces appearing at the inner half ends of the torsion bars are distributed through the wrench bar 33 both to the other torsion bar and to the opposite framework rectangular tube 12 or 13 through the wrench bar shoulders 34, 35. Since the wrench bar 33 merely rests at each end upon upper surface portions of the framework tubes 12, 13, in instances where an unusually high torsional load is imposed on either one or both of the wheel sets $W_1$, $W_3$, or on either one or both of the wheel sets $W_2$, $W_4$, such as when traveling at a high speed over a pothole, the unbalanced torsional stress thereby imposed at one end of the wrench bar 33 will react through the wrench bar against the opposite framework tube member to cause a temporary upward movement or lifting of the wrench bar. It is further to be noted that the torsion bar halves associated with each of the respective wheels $W_1$, $W_2$, $W_3$, $W_4$ act, to a limited extent, as cantilever springs wherein flexure is effected longitudinally thereof in addition to torsional flexure. Such action further serves to dissipate the kinetic load stresses imposed on the wheels within the torsion bar system and with minimum stress being imposed upon the supporting framework.

In instances where substantially equal torsional stresses are applied through each of the four wheels $W_1$, $W_2$, $W_3$, $W_4$, substantially equal and opposite reactive forces will be applied to the torsion bar system through the bridging wrench bar 33 so that substantially no reactive twisting force or moment will be imposed on the torsion bar mechanism supporting frame 11. Because of this distribution of torsional reactive forces through the torsion bar interconnecting wrench bar 33, the supporting framework 11 comprising the transversely extending rectangular tube members 12, 13 and end channel members 14, 15 can be of lightweight and simplified construction.

While I have illustrated and described herein only one form in which my invention can conveniently be embodied in practice, it is to be understood that this form is given by way of example only and not in a limiting sense. My invention, in brief, comprises all the embodiments and modifications coming within the scope and spirit of the following claims.

What I claim as new and desire to secure by Letters Patent is:

1. A torsion bar wheel suspension system for land trailers and the like comprising, in combination, an elongated framework member, a torque bar extending through a pair of opposed openings, one at each end of said elongated framework member, a pair of moment arm members fixed at one end each to one end each of said torsion bar, said moment arm members extending radially outwardly of said torsion bar in substantially the same rotative direction, a pair of wheels journalled one each at the other ends of said moment arm members, an elongated wrench bar affixed, at one end thereof, at a central position along said torque bar, said wrench bar being radially outwardly directed with respect to said torque bar and having an opposite end portion removably seated with respect to surface portions of said framework member to react therebetween for mutually relative movement upon the imposition of torsional stresses to said torque bar through one or the other of said moment arm members.

2. A torsion bar wheel suspension system as defined in claim 1 and further comprising a second torque bar extending through a second pair of opposed openings, one at each end of said elongated framework member, for supporting said second torque bar in laterally-spaced relation with respect to said first torque bar, a second pair of moment arm members fixed at one end each to one end each of said second torsion bar, said second pair of moment arm members extending radially outwardly of said second torsion bar in substantially the same rotative direction, but in the opposing direction with respect to the radial extension of said first-mentioned moment arm members, a second pair of wheels journalled one each at the other ends of said moment arm members, said elongated wrench bar transversely bridging said first and second torsion bars at central positions therealong and being fixed, at its other end , to (one end each) said second torsion bar , both end portions of said wrench bar being removably seated with respect to surface portions of said framework member to react therebetween upon the imposition of torsional stresses to said torque bars through said moment arm members.

3. A torsion bar wheel suspension as defined in claim 2 wherein said first and second pairs of moment arm members are directed in mutually outwardly-extending disposition.

4. A torsion bar wheel suspension as defined in claim 3 wherein said abutting surface portions of said framework member are eccentrically removed from the common axes of said pairs of openings of said elongated framework member, whereby said torsion bars will be somewhat deformed along their lengths to provide for inward canting of their associated moment arm members.

5. A torsion bar wheel suspension system as defined in claim 4 wherein said torsion bars are of hexagonal cross-sectional shape and wherein the end portions of said wrench bar are provided with complemental hexagonal openings through which said torsion bars extend.

6. A torsion bar wheel suspension system as defined in claim 5 wherein said elongated framework member comprises a pair of spaced, parallel, transversely-extending members secured in spaced, parallel relation by a pair of channel-shaped end members, said pairs of torsion bar openings being formed along said end channel members, said wrench bar member normally being seated, in bridging disposition, upon opposed upper surface portions of said transversely-extending members.

* * * * *